(12) United States Patent
Chevalier et al.

(10) Patent No.: US 7,946,612 B2
(45) Date of Patent: May 24, 2011

(54) SAFETY ARRANGEMENT

(75) Inventors: Nicolas Chevalier, Doncaster (AU); Jean Kuriakose, Yallambie (AU); Jovica Joveski, Bundoora (AU)

(73) Assignee: Autoliv Development AB, Vargarda (SE)

( * ) Notice: Subject to any disclaimer, the term of this patent is extended or adjusted under 35 U.S.C. 154(b) by 116 days.

(21) Appl. No.: 12/521,025

(22) PCT Filed: Dec. 27, 2006

(86) PCT No.: PCT/SE2006/001493
§ 371 (c)(1),
(2), (4) Date: Jun. 24, 2009

(87) PCT Pub. No.: WO2008/079057
PCT Pub. Date: Jul. 3, 2008

(65) Prior Publication Data
US 2010/0059974 A1  Mar. 11, 2010

(51) Int. Cl.
*H01H 9/00* (2006.01)
(52) U.S. Cl. ............... 280/728.2; 280/728.3; 200/61.54
(58) Field of Classification Search ............... 280/728.2, 280/728.3; 200/61.54
See application file for complete search history.

(56) References Cited

U.S. PATENT DOCUMENTS

| | | | | |
|---|---|---|---|---|
| 6,079,737 | A * | 6/2000 | Isomura et al. | 280/731 |
| 6,517,099 | B2 * | 2/2003 | Igawa et al. | 280/728.2 |
| 6,675,675 | B1 * | 1/2004 | Sauer et al. | 74/552 |
| 6,688,637 | B2 * | 2/2004 | Igawa et al. | 280/728.2 |
| 6,688,638 | B2 * | 2/2004 | Schutz | 280/728.2 |
| 6,719,323 | B2 * | 4/2004 | Kai et al. | 280/731 |
| 6,719,324 | B2 * | 4/2004 | Albers et al. | 280/731 |
| 6,871,870 | B2 * | 3/2005 | Schneider et al. | 280/728.2 |
| 6,881,911 | B2 * | 4/2005 | Sugimoto | 200/61.54 |
| 6,908,102 | B2 * | 6/2005 | Sugimoto | 280/728.2 |
| 7,159,897 | B2 * | 1/2007 | Worrell et al. | 280/731 |
| 7,185,915 | B2 * | 3/2007 | Fujita et al. | 280/731 |
| 7,261,317 | B2 * | 8/2007 | Amamori | 280/731 |
| 7,262,378 | B2 * | 8/2007 | Adachi et al. | 200/61.54 |
| 7,348,508 | B2 * | 3/2008 | Worrell | 200/61.54 |
| 7,422,236 | B2 * | 9/2008 | Worrell | 280/731 |

(Continued)

FOREIGN PATENT DOCUMENTS

DE    19927032 A1    12/2000

(Continued)

OTHER PUBLICATIONS

Supplementary European Search Report and Annex to Examination Report for EP 06835901.7.

*Primary Examiner* — Paul N Dickson
*Assistant Examiner* — Nicole Verley
(74) *Attorney, Agent, or Firm* — Harness, Dickey & Pierce, P.L.C.

(57) ABSTRACT

A safety arrangement in the form of an air-bag module (1) to be mounted to the steering wheel of a motor vehicle. The air-bag module (1) comprises a housing (2) and a cover (3). The cover (3) is moveably mounted to the housing (2). A wire (25) is clipped to the cover (3) and the wire (25) is configured to engage contact members (16) provided on the housing (2) when the cover (3) is moved relative to the housing (2). The wire (25) and the contacts (16) together act as a switch arrangement which may be connected to an electrical circuit in the vehicle which controls the vehicle's horn.

19 Claims, 3 Drawing Sheets

U.S. PATENT DOCUMENTS

Figure 1:
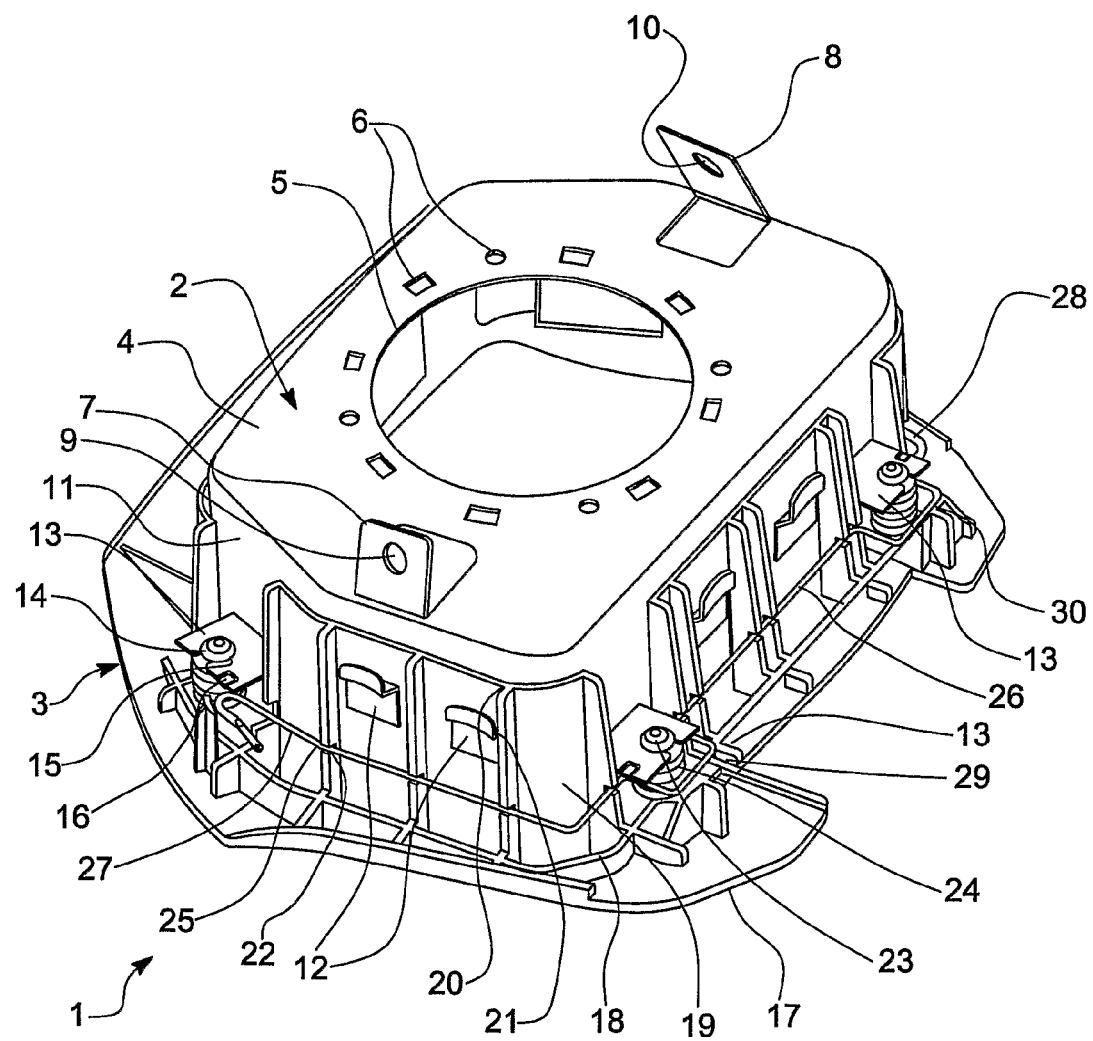

| | | | |
|---|---|---|---|
| 7,478,830 B2 * | 1/2009 | Weigand et al. | 280/731 |
| 7,490,852 B2 * | 2/2009 | Marotzke et al. | 280/731 |
| 7,556,282 B2 * | 7/2009 | Vigeant et al. | 280/728.2 |
| 7,566,071 B2 * | 7/2009 | Tsujimoto et al. | 280/731 |
| 7,621,560 B2 * | 11/2009 | Spencer et al. | 280/731 |
| 2001/0030412 A1 | 10/2001 | Igawa et al. | |
| 2002/0043786 A1 * | 4/2002 | Schutz | 280/728.2 |
| 2002/0079678 A1 | 6/2002 | Kai et al. | |
| 2002/0113419 A1 | 8/2002 | Kai et al. | |
| 2003/0173759 A1 * | 9/2003 | Grenier | 280/728.2 |
| 2004/0090052 A1 | 5/2004 | Sugimoto | |
| 2005/0017484 A1 * | 1/2005 | Worrell et al. | 280/731 |
| 2005/0161308 A1 * | 7/2005 | Frisch | 200/61.54 |
| 2006/0208465 A1 | 9/2006 | Worrell | |
| 2006/0208469 A1 * | 9/2006 | Marotzke et al. | 280/731 |

FOREIGN PATENT DOCUMENTS

| | | |
|---|---|---|
| EP | 1074435 A2 | 2/2001 |
| EP | 1 671 853 A | 6/2006 |
| EP | 1 914 124 A | 4/2008 |
| GB | 2398277 A | 8/2004 |

\* cited by examiner

SAFETY ARRANGEMENT

CROSS REFERENCE TO RELATED APPLICATIONS

This application is a 371 U.S. National Stage of International Application No. PCT/SE2006/001493, filed Dec. 27, 2006, and published in English as WO 2008/079057 A1 on Jul. 3, 2008.

DESCRIPTION OF INVENTION

The present invention relates to a safety arrangement, and more particularly relates to a safety arrangement in the form of an air-bag module which may be mounted to the steering wheel of a motor vehicle, and a method of assembling such a safety arrangement.

It has been proposed previously to mount an air-bag module to the steering wheel of a motor vehicle so that, in the event of a crash situation, an air-bag may be inflated out from the air-bag module to offer a level of protection to the driver of the motor vehicle. The air-bag module comprises an air-bag housing into which an air-bag is packed.

Typically, an air-bag cover is mounted to the housing to cover the air-bag which is packed within the housing. The cover is usually designed to present an attractive external appearance, which blends in with the remainder of the steering wheel, thereby giving a neat appearance to the overall steering wheel assembly. The cover may be configured to allow deployment of the air-bag from within the housing. For example, the cover may be provided with one or more split lines which are configured to split upon inflation of the air-bag so that a region of the cover moves to define an opening in the cover out of which the air-bag can inflate.

It has also become increasingly common for at least a portion of the cover to be designed so as to have the dual purpose of providing both an aesthetically pleasing outward appearance, whilst also functioning as a push-button for the vehicle's horn. In such arrangements the cover is usually hooked onto the air-bag housing and the cover is usually supported by one or more spring elements. The cover thus effectively "floats" on the housing and the cover may be depressed towards the housing, against the bias of the spring elements, to close horn-contacts forming part of the horn circuit, thereby actuating the vehicle horn. Upon release of the cover after being depressed, the spring elements are arranged to return the cover to its initial position prior to depression. The hooking engagement between the cover and the housing ensures that the cover and housing do not become disconnected as the cover returns to its initial position.

In order to ensure that the cover does not become inadvertently unhooked from the housing when the cover is pressed to actuate the horn, arrangements of this sort are usually configured so that the distance over which the cover moves when it is pressed to actuate the horn is an insufficient distance to unhook the cover from the housing. Whilst this configuration minimises the chances of the cover becoming detached from the housing, the configuration makes it difficult to assemble the air-bag module if the cover is separate from the housing prior to assembly. The reason for this is that the configuration which restricts the movement of the cover relative to the housing to prevent the cover from being unhooked from the housing during use also inadvertently obstructs the cover when the cover is being hooked to the housing during assembly. The difficulty in assembling the air-bag module as a result of this obstruction increases the time needed to assemble the air-bag module, which increases the manufacturing costs of the air-bag module.

The present invention seeks to provide an improved safety arrangement and an improved method of assembling a safety arrangement.

According to one aspect of the present invention, there is provided a safety arrangement suitable for mounting to the steering wheel of a motor vehicle, the safety arrangement comprising a housing for housing an air-bag and a cover which is moveably mounted to the housing to cover at least part of the air-bag, the housing being provided with a contact member, characterised in that the cover incorporates a plurality of spaced apart attachment formations which each retain part of a connection element to attach the connection element to the cover, the connection element and the contact member together defining part of an electrical circuit for use as a switch in a motor vehicle electrical circuit, the connection element being moveable in response to movement of the cover, and the cover being moveable, relative to the housing, from an initial position in which the connection element is spaced apart from the contact member to an actuating position in which the connection element engages the contact member to form an electrical connection with the contact member.

Preferably each of the attachment formations is an indentation defined in a side wall of the cover.

Conveniently a side wall of one of the cover and the housing is provided with at least one aperture, and a side wall of the other of the cover and the housing is provided with a respective number of hook-shaped elements configured to engage with an edge of the respective aperture to hook the housing and cover to one another.

Advantageously the connection element provided on the cover engages the housing when the cover is moved by a predetermined distance relative to the housing to block further movement of the cover relative to the housing to prevent the cover and the housing from becoming unhooked from one another.

Preferably the part of the connection element which engages the housing to block further movement of the cover relative to the housing is a part of the connection element which extends between two of the attachment formations.

In one embodiment the housing is at least partly of metal and the contact member is defined by a part of the housing which is of metal.

In another embodiment the housing is of a plastics material and the contact member is defined by a metal member which is mounted to the housing.

Preferably the housing is provided with a plurality of contact members and the connection element is configured to be engageable with all of the contact members simultaneously when the cover is moved by a predetermined distance relative to the housing.

Conveniently the safety arrangement further comprises a plurality of resilient elements which are each positioned between a respective one of the contact members and part of the cover, the resilient elements acting to bias the cover away from the contact members so that the cover returns to the initial position after the cover has been moved relative to the housing.

Advantageously the connection element is an elongate metal wire.

Preferably the wire is resiliently deformable and the wire is clipped around a correspondingly shaped part of the cover so that parts of the wire are retained by the attachment formations.

Conveniently the wire is dimensioned so as to be attachable to the cover after the cover has been mounted to the housing.

According to another aspect of the present invention, there is provided a method of assembling a safety arrangement comprising the steps of: providing a separate housing and cover, the housing being provided with a contact member; mounting the cover moveably to the housing; and attaching a connection element to the cover by bringing the connection element into engagement with the cover so that parts of the connection element are retained by a plurality of attachment formations which are provided on the cover at spaced apart positions, the attachment formations being positioned so that when the connection element is retained by the attachment formations the connection element is positioned so that movement of the cover from an initial position to an actuating position moves the connection element to engage and form an electrical connection with the contact member.

Preferably a side wall of one of the cover and housing is provided with at least one aperture, and a side wall of the other of the cover and housing is provided with a respective number of hook-shaped elements configured to engage with an edge of the respective aperture, and the cover is mounted moveably to the housing by hooking the cover and the housing to one another.

Conveniently the connection element is attached to the cover at a position in which, when the cover is moved by a predetermined distance relative to the housing, the connection element blocks further movement of the cover relative to the housing to prevent the cover and the housing from becoming unhooked from one another.

Advantageously the part of the connection element which engages the housing to block further movement of the cover relative to the housing is a part of the connection element which extends between two of the attachment formations.

Preferably the step of attaching the connection element to the cover occurs after the cover and the housing have been hooked to one another.

According to a further aspect of the present invention, there is provided a safety arrangement assembled in accordance with the method of any one claims 13 to 17 as defined hereinafter.

Figure 2:
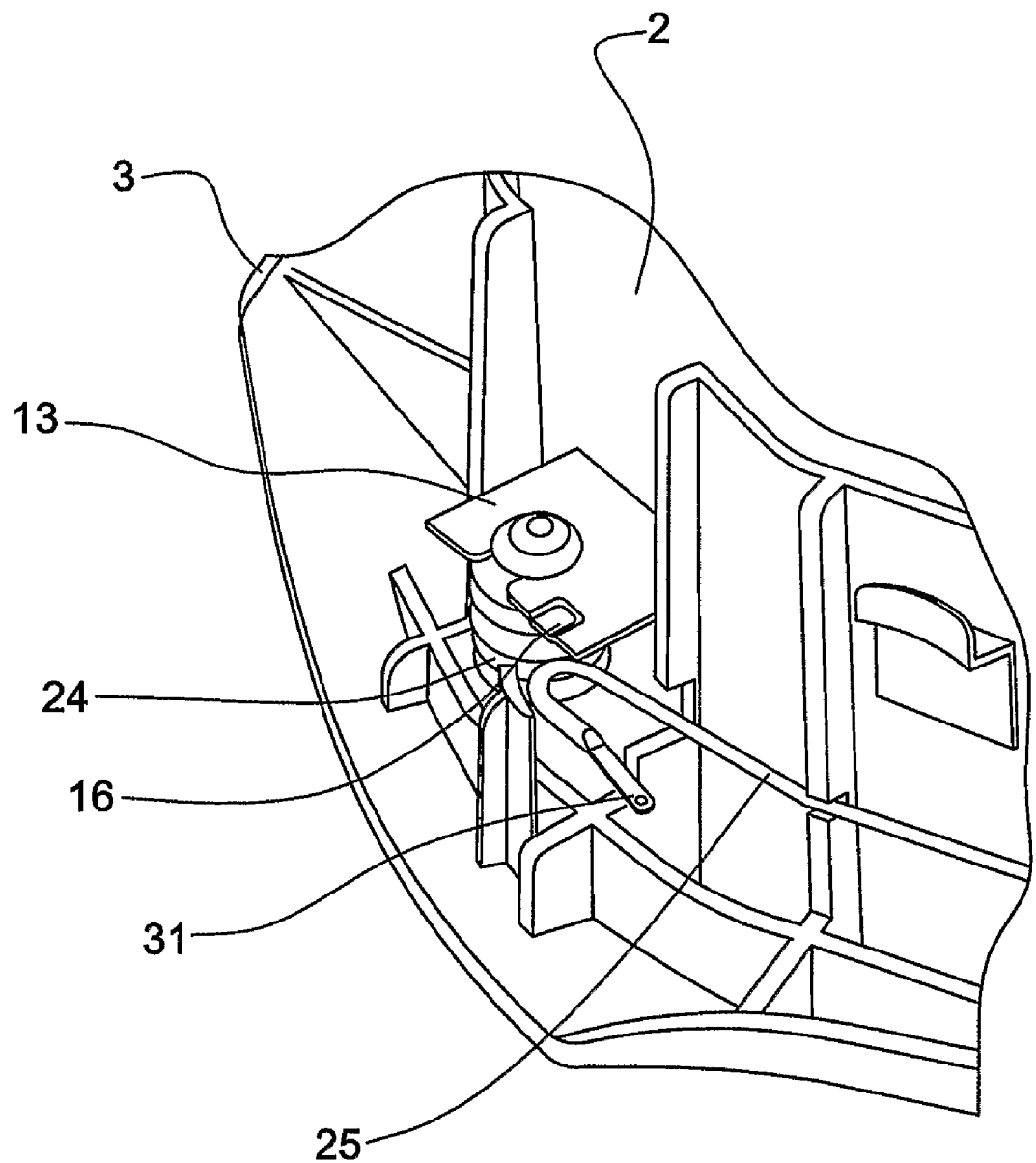
Figure 3:
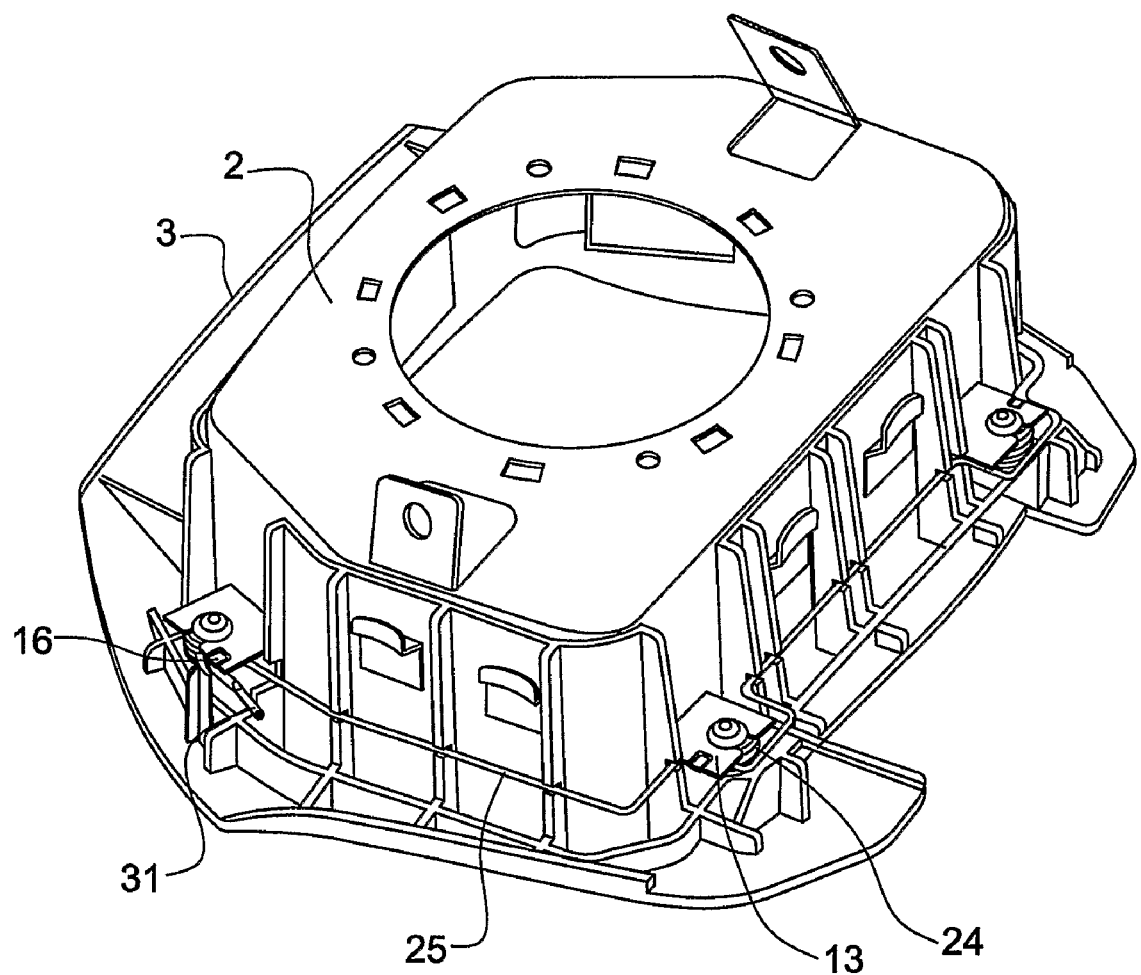

In order that the invention may be more readily understood, and so that further features thereof may be appreciated, embodiments of the invention will now be described, by way of example, with reference to the accompanying drawings in which:

FIG. 1 is a diagrammatic perspective view of the underneath of an air-bag module in accordance with a preferred embodiment of the invention with a cover of the air-bag module in an initial position, FIG. 2 is an enlarged view of part of the air-bag module of FIG. 1, and FIG. 3 is a view corresponding to FIG. 1, with the cover in an actuating position.

Referring initially to FIG. 1 of the accompanying drawings, a safety arrangement in accordance with a preferred embodiment of the invention takes the form of an air-bag module 1 which comprises a housing 2 and a cover 3. The housing 2 is of sheet metal which is shaped to receive an air-bag (not shown) which is packed within the housing 2. The housing 2 has a generally planar base 4 which has a central aperture 5 formed in a central region of the base 4 through which part of an inflator (not shown) can extend. A plurality of fixing apertures 6 are formed in the base 4 at spaced apart positions around the central aperture 5 to allow the inflator to be fixed to the base 4.

The base 4 is shaped to correspond with the shape of the central portion of a steering wheel to which the air-bag module 1 is to be mounted. At opposite ends of the base 4 there is a respective one of a pair of mounting tabs 7,8. Each mounting tab 7,8 is formed by a generally rectangular region of the base 4 which is cut partly from the base 4 and bent so that the region defines a tab 7,8 which is upstanding from and generally perpendicular to the base 4. Each of the mounting tabs 7,8 is provided with a respective mounting aperture 9,10. The mounting tabs 7,8 and their respective mounting apertures 9,10 define structures on the housing 2 which allow the housing 2 to be mounted to the steering wheel of a motor vehicle.

The housing 2 has upstanding side walls 11 which are formed integrally with the base 4 and which extend perpendicularly relative to the base 4 around the periphery of the base 4. The housing 2 has eight generally hook-shaped elements 12 (only four of which can be seen in FIG. 1) which are formed at spaced apart positions on the side walls 11. The hook-shaped elements 12 are formed by regions of the side walls 11 which have been cut and bent. Each hook-shaped element 12 has a first portion which extends generally perpendicularly outwardly from the side wall 11 of the housing 2 and a second portion which extends parallel to the side wall 11. The purpose of the hook-shaped elements 12 will become clear from the description below.

The housing 2 has four generally rectangular supports 13 (only three of which can be seen in FIG. 1). Each support 13 is defined by a part of the housing 2 which extends perpendicularly outwardly from the end of one of the side walls 11 which is remote from the base 4. Each support 13 has a generally slot shaped cutaway section which extends from one edge of the support 13 to the centre of the support 13 and which terminates in a widened, generally circular aperture 14. Part of the edge of the aperture 14 is deformed into a lip 15 which extends around the periphery of part of the aperture 14. The purpose of the lip 15 will become clear from the description below.

Each support 13 has a generally rectangular indentation near one of its edges which defines an electrical contact member 16 on one side of the respective support 13. The purpose of the contact members 16 will become clear from the description below.

The cover 3 is of a plastics material and comprises a generally planar covering portion 17. The covering portion 17 is shaped so as to correspond with the shape of the central region of a steering wheel to which the air-bag module 1 is to be mounted. The shape and finish of the cover 3 is selected so that the outer surface of the cover 3 matches adjacent surfaces on part of a steering wheel when the air-bag module is mounted to the steering wheel so that the fully assembled steering wheel has an aesthetically pleasing appearance.

The covering portion 17 of the cover 3 has strengthening ribs 18 formed integrally on its inner face to increase the rigidity of the cover 3. A plurality of side walls 19 are formed integrally with the covering portion 17. The side walls 19 extend generally perpendicularly outwardly from the covering portion 17 on the inner side of the covering portion 17. The side walls 19 of the cover 3 are shaped and positioned so as to correspond with the shape of the side walls 11 of the housing 2 so that the side walls 19 of the cover 3 can be interested with the side walls 11 of the housing 2, as shown in FIG. 1.

The side walls 19 of the cover 3 are provided with eight generally rectangular apertures 20 at spaced apart positions. Each rectangular aperture 20 is positioned and dimensioned so as to receive a respective one of the hook-shaped elements 12 of the housing 2 when the cover 3 is mounted to the housing 2 (as shown in FIG. 1). One edge of each of the rectangular apertures 20 defines a blocking edge 21 which, as will become clear from the description below, is configured to block the first portion of a respective one of the hook-shaped elements 12 to hold the cover 3 in an initial position.

A plurality of attachment formations in the form of indentations 22 are formed at spaced apart positions around the side walls 19, adjacent where the side walls 19 join the covering portion 17. Each of the indentations 22 is defined by a generally U-shaped notch which is formed in a rib which reinforces one of the side walls 19. The purpose of the indentations 22 will become clear from the description below.

The cover 3 is provided with four generally hollow and cylindrical guide rods 23 which are formed integrally with the covering portion 17 so as to protrude perpendicularly from the inner side of the covering portion 17, adjacent the side walls 19 of the cover 3. It is to be understood that each of the guide rods 23 is positioned on the cover 3 so that each guide rod 23 protrudes through one of the apertures 14 of one of the supports 13 on the housing 2 when the cover 3 is mounted to the housing 2.

A resilient element in the form of a coil spring 24 is fitted around a respective one of the guide rods 23. When the cover 3 is attached to the housing 2, each of the supports 13 is in engagement with one of the coil springs 24, so that the coil springs 24 bias the cover 3 away from the housing 2.

The lips 15 on the supports 13 each protrude into the end of a respective one of the coil springs 24 to fix the end of each of the coil springs relative to a respective one of the supports 13.

The cover 3 carries a connection element in the form of an elongate metal wire 25 which is fitted around the side walls 19 of the cover 3 in each of the indentations 22. The wire 25 is resiliently deformable and is shaped so that the wire 25 can be clipped to the cover 3. Once the wire 25 is clipped to the cover 3 the resilience of the wire 25 biases parts of the wire 25 into each of the indentations 22 to retain the wire 25 in position on the cover 3 without the need for separate fixing elements such as screws.

The wire 25 is formed generally of three sections: a base section 26 and two side sections 27,28. The sections 26-28 are formed integrally with one another. Each side section 27,28 is generally parallel to the other side section 27,28, with each of the side sections 27,28 extending generally perpendicularly from a respective end of the base section 26. The base section 26 has two generally rectangular loops 29,30 formed in it which are positioned so that after the wire 25 has been clipped to the cover 3 each of the loops 29,30 extends around one of the coil springs 24 so that the wire 25 does not interfere with the operation of the coil springs 24. The wire 25 is shaped to clip around a correspondingly shaped part of the cover 3 with parts of the wire 25 being retained within the indentations 22. The wire 25 is dimensioned so as to be attachable to the cover 3 after the cover 3 has been mounted to the housing 2.

Each of the loops 29,30 in the wire 25 is positioned beneath one of the contact members 16 in one of the supports 13. Each of the side arms 27,28 of the wire 25 extends around the side walls 19 of the cover 3 and the free ends of the side arms 27,28 are terminated by a generally U-shaped bend in the wire 25, as shown in FIG. 2. Each of the free ends of the side arms 27,28 is positioned beneath one of the contact members 16 of one of the supports 13. The ends of the side sections 27,28 are terminated in a short flattened portions 31 which are configured to be connected to an electrical cable forming part of a horn circuit in a motor vehicle.

The housing 2, cover 3, coil springs 24 and the wire 25 are manufactured separately from one another and the separate components are assembled together to form the air-bag module as follows: Firstly, each of the coil springs 24 is fitted around a respective one of the guide rods 23 on the cover 2. Once the coil springs 24 have been installed, the cover 3 is moveably mounted to the housing 2 by nesting together the side walls 11 of the housing 2 with the side walls 19 of the cover 3. As the side walls 11,19 are nested together each of the hook-shaped elements 12 extends through a respective one of the rectangular apertures 20 in the cover 3. As the housing 2 and the cover 3 are moved together, each of the supports 13 compresses a respective one of the coil springs 24.

Once the cover 3 and the housing 2 have been pushed together they are then released so that the coil springs 24 bias the cover 3 away from the housing 2. As the cover 3 moves away from the housing 2 the side walls 11 of the cover 3 move relative to the hook-shaped elements 12 of the housing 2 until the blocking edges 21 of the apertures 20 engage the hook-shaped elements 12 to prevent further movement of the cover 3 relative to the housing 2. The cover 3 is thus effectively hooked onto the housing 2 and held in an initial position by the hook-shaped elements 12 under bias by the coil springs 24. It is to be appreciated that the cover 3 may be released subsequently from the housing 2 by pressing the cover 3 against the housing 2 so that the cover 3 moves by a distance of approximately 8 mm, which is the distance required to move the cover 3 so that the hooked part of the hook-shaped elements 12 is free to pass through the apertures 20.

After the cover 3 has been hooked onto the housing 2 the wire 25 is clipped around the cover 3 to complete the assembly of the air-bag module 1. Once the wire 25 has been clipped to the cover 3, the wire 25 forms a barrier which prevents the cover 3 from being pressed towards the housing 2 by more than a distance of about 2 mm. The wire 25 blocks further movement of the cover 3 by engaging one or more of the supports 13 which each form part of the housing 2. The parts of the wire 25 which engage the supports 13 to block further movement of the cover 3 relative to the housing 2 are the parts of the wire 25 which extend between the indentations 22. The wire 25 blocks further movement of the wire 25 beyond about 2 mm from the initial position of the cover 3. This blocking function performed by the wire 25 and the supports 13 prevent the cover 3 from moving the distance of about 8 mm towards the housing 2 to release the hook-shaped elements 12 from the apertures 20. Consequently, it is to be appreciated that this blocking of the movement of the cover 3 by the wire 25 and the supports 13 prevents the cover 3 from moving the distance of about 8 mm to release the hook-shaped elements 12 from the apertures 20, and thus the cover 3 will not become detached from the housing 2 when the cover 3 is pressed.

If it becomes necessary to remove the cover 3 from the housing 2, for instance to repack an air-bag into the housing 2, the wire 25 can be unclipped from the cover 3 to allow the cover 3 to be moved towards the housing 2 over the distance of about 8 mm required to be able to unhook the cover 3 from the housing 2.

The process of attachment of the wire 25 to the cover 3 is quick because of the simple nature of the clipping attachment. The wire 25 is cheap to produce because the wire 25 is a simple component, and since the wire 25 is a single integral component the wire 25 is less likely to break than a more complex horn circuit component which is constructed from more than one part.

Once the air-bag module 1 has been assembled fully, the air-bag module 1 can be mounted via the mounting tabs 7,8 to the steering wheel of a motor vehicle. In this preferred embodiment the housing 2 is of metal and hence the housing 2 has been mounted to the steering wheel the metal housing 2 engages and is connected electrically to part of the steering wheel which is grounded to the chassis of the vehicle. The housing 2 is thus connected electrically to the ground of the vehicle's electrical system. One end of a cable can be connected to one of the flattened portions 31 of the wire 25 to connect the wire 25 to a horn circuit in the vehicle.

When the cover 3 is in the initial position relative to the housing 2, that is to say when the cover 3 is held against the bias of the coil springs 24 by the hook shaped elements 12, the wire 25 is spaced apart from the contact members 16 on the housing 2. However, if the cover 3 is pressed towards the housing 2, for instance by a driver wishing to actuate the horn of the vehicle, the cover 3 moves against the bias of the coil springs 24 towards the housing 2 and the wire 25 is moved towards the contact members 16. If the cover 3 is depressed sufficiently (about 2 mm), the cover 3 moves to an actuating position in which the wire 25 contacts one or more of the contact members 16 to form an electrical connection between the wire 25 and one or more of the contact members 16, as shown in FIG. 3. When the wire 25 contacts one or more of the contact members 16, the cable attached to the wire 25 effectively becomes connected to the ground, which completes the horn circuit to sound the horn of the vehicle. It will be appreciated that, whilst the wire 25 only needs to engage one of the contact members 16 to complete the electrical circuit, the wire 25 is engageable with all of the contact members 16 simultaneously if the cover 3 is depressed sufficiently.

In order to silence the horn the driver can release the cover 3 and the cover 3 will be moved away from the housing 2 under the bias provided by the coil springs 24. The cover 3 returns to its initial position in which the wire 25 does not engage the contact members 16, and the horn circuit is thus not complete. The wire 25 and the contact members 16 can thus act as a switch in the electrical circuit in the vehicle which controls the vehicle's horn.

Whilst in the preferred embodiment described above the housing 2 is of metal, in other embodiments the housing 2 may be of a plastics material. In such other embodiments a metal member, such as a metal plate can be mounted to each of the supports 13, with each of the metal plates being connected by a cable to part of the horn circuit. Consequently, the wire 25 is moved against one of the plates when the cover 3 is pressed to complete the horn circuit.

Whilst in the embodiments described above, the housing 2 is provided with the hook-shaped elements 12 and the cover 3 is provided with the apertures 20, in further embodiments this arrangement can be interchanged so that hook-shaped elements are provided on the walls 19 of the cover 3 and apertures are provided in the walls 11 of the housing 2. In such embodiments the direction in which the hook-shaped elements 12 face must be reversed so that the hook-shaped elements which are provided on the cover 3 can hold the cover 3 against the bias of the coil springs 24. It will, however, be appreciated that even if the hooks and apertures are interchanged in such further embodiments the cover 3 will still be hooked to the housing 2 but able to move relative to the housing 2 when the cover 3 is pressed.

Whilst in the preferred embodiment described above there are four coil springs 24 and four supports 13, in other embodiments there may be a greater or fewer number of coil springs and supports, just as long as there is a connection element provided on the cover 3 which is moved in response to movement of the cover 3 to contact a contact member provided on the housing 2.

Whilst in the preferred embodiment described above, the attachment formations are in the form of generally U-shaped indentations 22, in other embodiments the attachment formations may be a different shape. In such embodiments the attachment formations may be any shape, just as long as there are a plurality of spaced apart attachment formations provided on the cover which each retain part of a connection element to attach the connection element to the cover 3.

When used in this specification and claims, the terms "comprises" and "comprising" and variations thereof mean that the specified features, steps or integers are included. The terms are not to be interpreted to exclude the presence of other features, steps or components.

The invention claimed is:

1. A safety arrangement suitable for mounting to the steering wheel of a motor vehicle, the safety arrangement comprising:
   a housing for housing an air-bag, the housing provided with a contact member; and
   a cover moveably mounted to the housing to cover at least part of the air-bag, the cover including a plurality of spaced apart attachment formations which each retain part of a connection element to attach the connection element to the cover, the connection element and the contact member together defining part of an electrical circuit for use as a switch in a motor vehicle electrical circuit, the connection element being moveable in response to movement of the cover, the cover moveable relative to the housing from an initial position in which the connection element is spaced apart from the contact member to an actuating position in which the connection element engages the contact member to form an electrical connection with the contact member;
   wherein the connection element is resiliently deformable and clipped to the cover such that the connection element is biased into each of the attachment formations to retain the connection element in position on the cover.

2. The safety arrangement according to claim 1, wherein each of the attachment formations is an indentation defined in a side wall of the cover.

3. The safety arrangement according to claim 1, wherein a side wall of one of the cover and the housing is provided with at least one aperture, and a side wall of the other of the cover and the housing is provided with a respective number of hook-shaped elements configured to engage with an edge of the respective aperture to hook the housing and cover to one another.

4. The safety arrangement according to claim 3, wherein the connection element provided on the cover engages the housing when the cover is moved by a predetermined distance relative to the housing to block further movement of the cover relative to the housing to prevent the cover and the housing from becoming unhooked from one another.

5. The safety arrangement according to claim 4, wherein the part of the connection element which engages the housing to block further movement of the cover relative to the housing is a part of the connection element which extends between two of the attachment formations.

6. The safety arrangement according to claim 1, wherein the housing is constructed at least partly of metal and the contact member is defined by a part of the housing which is of metal.

7. The safety arrangement according to claim 1, wherein the housing is constructed of a plastic material and the contact member is defined by a metal member which is mounted to the housing.

8. The safety arrangement according to claim 1, wherein the housing is provided with a plurality of contact members and the connection element is configured to be engageable with all of the contact members simultaneously when the cover is moved by a predetermined distance relative to the housing.

9. The safety arrangement according to claim 8, wherein the safety arrangement further comprises a plurality of resilient elements which are each positioned between a respective one of the contact members and part of the cover, the resilient elements acting to bias the cover away from the contact members so that the cover returns to the initial position after the cover has been moved relative to the housing.

10. The safety arrangement according to claim 1, wherein the connection element is an elongate metal wire.

11. The safety arrangement according to claim 10, wherein the wire is resiliently deformable and the wire is clipped around a correspondingly shaped part of the cover so that parts of the wire are retained by the attachment formations.

12. The safety arrangement according to claim 10, wherein the wire is dimensioned so as to be attachable to the cover after the cover has been mounted to the housing.

13. A method of assembling a safety arrangement comprising the steps of:
   providing a separate housing and cover, the housing being provided with a contact member;
   mounting the cover moveably to the housing; and
   attaching a connection element to the cover by resiliently deforming the connection element and engaging the connection element with the cover such that the connection element is retained by a plurality of attachment formations provided on the cover at spaced apart positions by a resilient bias of the connection element, the attachment formations being positioned so that when the connection element is retained by the attachment formations the connection element is positioned so that movement of the cover from an initial position to an actuating position moves the connection element to engage and form an electrical connection with the contact member.

14. The method of assembling a safety arrangement according to claim 13, wherein a side wall of one of the cover and housing is provided with at least one aperture, and a side wall of the other of the cover and housing is provided with a respective number of hook-shaped elements configured to engage with an edge of the respective aperture, and the cover is mounted moveably to the housing by hooking the cover and the housing to one another.

15. The method of assembling a safety arrangement according to claim 14, wherein the connection element is attached to the cover at a position in which, when the cover is moved by a predetermined distance relative to the housing, the connection element blocks further movement of the cover relative to the housing to prevent the cover and the housing from becoming unhooked from one another.

16. The method of assembling a safety arrangement according to claim 15, wherein the part of the connection element which engages the housing to block further movement of the cover relative to the housing is a part of the connection element which extends between two of the attachment formations.

17. The method of assembling a safety arrangement according to claim 13, wherein attaching the connection element to the cover occurs after the cover and the housing have been mounted moveably to one another.

18. The safety arrangement assembled in accordance with the method of claim 13.

19. A safety arrangement suitable for mounting to the steering wheel of a motor vehicle, the safety arrangement comprising:
   a housing for housing an air-bag, the housing provided with a contact member; and
   a cover moveably mounted to the housing to cover at least part of the air-bag, the cover including a plurality of spaced apart attachment formations which each retain part of a connection element to attach the connection element to the cover, the connection element and the contact member together defining part of an electrical circuit for use as a switch in a motor vehicle electrical circuit, the connection element being moveable in response to movement of the cover, the cover moveable relative to the housing from an initial position in which the connection element is spaced apart from the contact member to an actuating position in which the connection element engages the contact member to form an electrical connection with the contact member;
   wherein the connection element is an elongated metal wire.

* * * * *